United States Patent
Przybyla et al.

(10) Patent No.: US 7,040,764 B2
(45) Date of Patent: May 9, 2006

(54) PROJECTION SYSTEM USING AMBIENT LIGHT

(75) Inventors: James R. Przybyla, Philomath, OR (US); Arthur Piehl, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/691,835

(22) Filed: Oct. 23, 2003

(65) Prior Publication Data

US 2005/0088623 A1    Apr. 28, 2005

(51) Int. Cl.
*G03B 21/14* (2006.01)
*G03B 21/00* (2006.01)
*G03B 21/56* (2006.01)

(52) U.S. Cl. .................. 353/84; 353/122; 359/443
(58) Field of Classification Search ............. 359/443, 359/449, 454, 460; 353/84, 122, 98, 102, 353/119, 31; 385/43; 362/555, 558, 559, 362/560; 257/98; 607/89
See application file for complete search history.

(56) References Cited

U.S. PATENT DOCUMENTS

| | | | |
|---|---|---|---|
| 4,003,080 A | 1/1977 | Maiman et al. ............... 358/63 |
| 4,713,577 A | 12/1987 | Gualtieri et al. ............ 313/468 |
| 4,798,994 A | 1/1989 | Rijpers et al. .............. 313/478 |
| 5,045,706 A | 9/1991 | Tanaka et al. ........... 250/483.1 |
| 5,095,244 A | 3/1992 | Maeda et al. ............... 313/495 |
| 5,162,160 A | 11/1992 | Matsui et al. ............... 428/690 |
| 5,193,015 A | 3/1993 | Shanks ........................ 359/53 |
| 5,335,022 A * | 8/1994 | Braun et al. ................ 348/744 |
| 6,373,184 B1 | 4/2002 | Suh et al. ................... 313/486 |
| 6,428,169 B1 * | 8/2002 | Deter et al. ................... 353/20 |
| 6,685,341 B1 * | 2/2004 | Ouderkirk et al. .......... 362/297 |
| 6,769,774 B1 * | 8/2004 | McDowell .................... 353/84 |
| 6,836,361 B1 * | 12/2004 | Hou .......................... 359/443 |
| 6,847,483 B1 * | 1/2005 | Lippey et al. .............. 359/443 |

* cited by examiner

*Primary Examiner*—Melissa Jan Koval

(57) ABSTRACT

Ambient light that is modified for use in a projection system is described. In an embodiment of the present invention, a projection system includes a projection screen and an ambient light source. The projection screen reflects and/or emits one or more ranges of wavelengths of visible light. The projection screen also absorbs visible wavelengths of light in at least one other range that is not included in the one or more ranges. The ambient light source outputs visible wavelengths of light in the at least one other range. The at least one other range of wavelengths have a greater intensity as weighted by the sensitivity of a human eye than that of the wavelengths of light output by the ambient light source in the one or more ranges.

33 Claims, 6 Drawing Sheets

600 →

602 →

CONFIGURING AN AMBIENT LIGHT SOURCE TO OUTPUT WAVELENGTHS OF LIGHT IN ONE OR MORE RANGES THAT CAUSE A PROJECTION SCREEN TO AT LEAST ONE OF REFLECT AND EMIT VISIBLE LIGHT AND WAVELENGTHS OF LIGHT IN AT LEAST ONE OTHER RANGE THAT ARE VISIBLE AND ARE NOT INCLUDED IN THE ONE OR MORE RANGES

604 →

RECEIVING A LIGHT EMITTING DEVICE THAT IS CONFIGURED TO EMIT WAVELENGTHS OF LIGHT THAT INCLUDE THE ONE OR MORE RANGES AND THE AT LEAST ONE OTHER RANGE

606 →

POSITIONING A LIGHT FILTERING STRUCTURE THAT IS CONFIGURED TO AT LEAST ONE OF REFLECT AND ABSORB THE ONE OR MORE RANGES

608 →

FORMING A LIGHT EMITTING DEVICE THAT IS CONFIGURED TO EMIT VISIBLE LIGHT IN THE AT LEAST ONE RANGE OF VISIBLE LIGHT THAT HAS A GREATER INTENSITY THAN VISIBLE LIGHT THAT IS EMITTED BY THE LIGHT EMITTING DEVICE IN THE ONE OR MORE RANGES

*Fig. 6*

PROJECTION SYSTEM USING AMBIENT LIGHT

TECHNICAL FIELD

The present invention generally relates to the field of image projection and more particularly to ambient light in a projection system.

BACKGROUND

Projectors are utilized in a variety of environments. From home theaters to business presentations, projectors are provided to offer a wide range of functionality to consumers. For example, a projector may provide a display of a slide show, display a movie in a home theater environment, and so on. To display an output of the projector, a projection screen may be utilized. The projection screen may be configured to reflect the output of the projector such that it is viewable by one or more people. For example, a projection screen in a movie theater environment may reflect light that is projected by a movie projector to be viewable by people in the movie theater.

The environment in which the projector and screen are utilized may have an effect on the visual quality of the image that is displayed on the screen. For example, one measure of the visual quality of a projected image is contrast ratio. Contrast ratio is the ratio of the brightness of a white pixel, i.e. picture element, to the brightness of a black pixel. Because a typical projection screen may be highly reflective to reflect light from a projector, a black pixel is generally as white as the ambient lighting in the environment that includes the projection screen. To maximize contrast ratio, projectors may use bright light sources to make white pixels much brighter than ambient light. This, however, is costly to the projectors in terms of power, size and heat dissipation. Further, this cost is increased by the amount and type of ambient light that is encountered by a projector for use in the environment. For instance, as the amount of ambient light increases in an environment, a projector which is configured for the environment may include a higher-powered light source, which may increase both the size and the cost of the projector.

Therefore, it would be an advance in the art to provide a projection system that addresses ambient light.

BRIEF DESCRIPTION OF THE DRAWINGS

FIG. 6 is a flow chart illustrating a procedure in an exemplary embodiment of the present invention showing configuration of an ambient light source to output light that has a reduced effect on an image that is displayed on a projection screen.

The same reference numbers are used throughout the drawings to reference like features and components.

DETAILED DESCRIPTION

Overview

Figure 1:
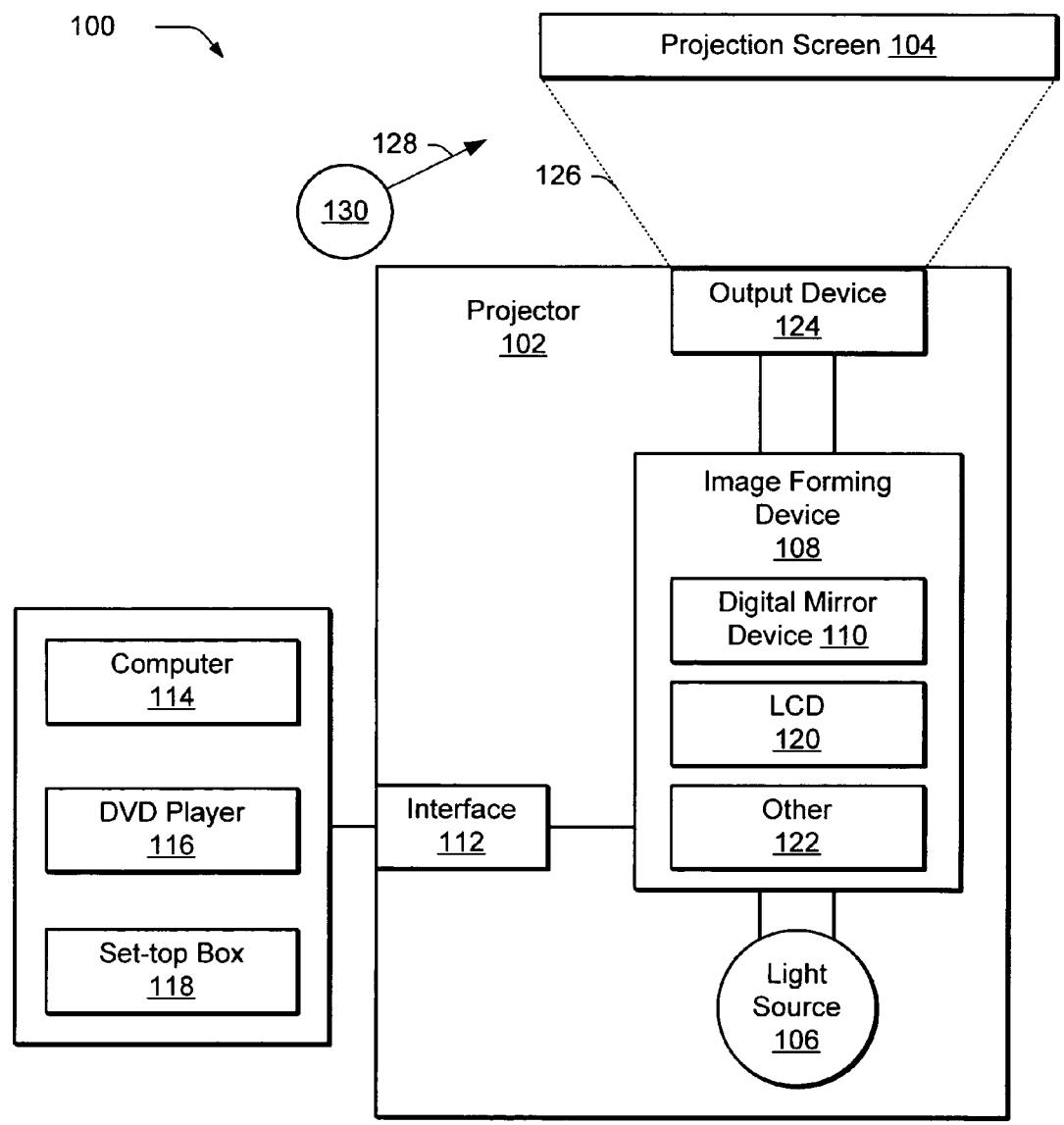
FIG. 1 is an illustration of an exemplary embodiment of the present invention that shows a projection system that includes a projector that provides an output for display on a screen.

Ambient light that is modified for use in a projection system is described. In an embodiment of the present invention, a projection system includes a projection screen and an ambient light source. The projection screen reflects and/or emits one or more ranges of wavelengths of visible light. The projection screen also absorbs visible wavelengths of light in at least one other range that is not included in the one or more ranges. The ambient light source outputs visible wavelengths of light in the at least one other range. The at least one other range of wavelengths have a greater intensity as weighted by the sensitivity of a human eye than that of the wavelengths of light output by the ambient light source in the one or more ranges.

A projector, for example, may project light in well-defined ranges of wavelengths, such as ranges of red, green and blue light. The projection screen may be coated with filters, dyes, pigments and/or other coatings that are absorptive in all visible wavelengths of light except those employed by the projector, i.e. the ranges of red, green and blue light. Thus, the projection screen is substantially darker when illuminated by broad spectrum light, but only marginally darker when illuminated by the projector in the ranges of wavelengths that are output by the projector. In this way, the projection screen provides improved contrast ratios. Ambient light may then be engineered as a part of the projection system to further increase the contrast ratio. Ambient light sources, for instance, may emit wavelengths of light that are absorbed by the projection screen that have a greater intensity than wavelengths of light that are emitted by the ambient light source in the ranges of wavelengths that are output by the projector. Therefore, the amount of ambient light that is reflected by the projection screen from light output by the ambient light sources is reduced. This allows operation of the projection system in brighter ambient conditions and allows operation of lower-powered projectors.

In another embodiment of the present invention, an apparatus includes a light filtering structure. The light filtering structure reflects and/or absorbs wavelengths of incident light in the one or more ranges and transmits wavelengths of visible incident light that is not included in the one or more ranges. The wavelengths of light transmitted by the light filtering structure in the at least one other range have a greater intensity as weighted by the sensitivity of a human eye than that of the wavelengths of light transmitted by the ambient light source in the one or more ranges. The wavelengths of light in the one or more ranges provide a full-color image when output by a projector and displayed on a projection screen. The wavelengths of light in the at least one other range are absorbed by the projection screen.

FIGS. 1 through 6 illustrate exemplary embodiments of projection systems. The projection systems in each embodiment of the present invention may be configured in a variety of ways, such as for use in a home theater for display of a television program, for use in an office to display a slide-show presentation, for use in a movie theater, for use as a rear-projection television, and so on.

FIG. 1 is an illustration of an exemplary embodiment of the present invention that shows a projection system 100 that includes a projector 102 that provides an output for display on a projection screen 104. The projector 102 includes a light source 106 that supplies light that is used to provide the output of the projector 102. The light source 106 may be configured in a variety of ways, such as an arc halogen discharge lamp. Arc halogen discharge lamps do not contain a filament to emit light but rather ionize a gaseous vapor though a high-energy arc discharge between two electrodes. Other light sources may also be utilized, such as incandescent light bulbs, fluorescent lights, white-light emitting diodes, and so forth.

Light from the light source 106 is directed toward an image forming device 108. The image forming device 108 provides an image using the light from the light source 106. To provide the image, the image forming device 108 may include a variety of components. In one embodiment, the image forming device 108 is configured to perform digital light processing through the use of a digital mirror device 110. The digital mirror device 110 includes a plurality of mirrors that are mounted onto a substrate. The mirrors of the digital mirror device 110 may be rotated individually, which causes each of the mirrors to either reflect or not reflect light from the light source 106.

If a single digital mirror device 110 is utilized, red, green and blue (RGB) portions of an image are shown in sequence to supply a colored image. For example, a color wheel that has red, green and blue (RGB) arcuate segments may be utilized to supply the colors. The color wheel is placed between light source 106 and the digital mirror device 110 and spun to provide red, green or blue light, depending on which segment of the color wheel is placed in a pathway of light that is output from the light source 106 to the digital mirror device 110. Configuration of the mirrors on the digital mirror device 110 is synchronized with the placement of the segments of the color wheel in the light path to provide sequential red, green and blue images. By supplying the sequential images in rapid sequence, a full color image is perceived by the human eye. In another embodiment, multiple digital mirror devices are utilized to form an image. For example, separate digital mirror devices may be utilized to provide respective outputs of red, green and blue light. Light reflected from each of the separate digital mirror devices is combined to display a full color image.

The mirrors of the digital mirror device 110 may be configured in response to an input received from an interface 112. The input may be supplied to the interface 112 from a variety of devices, such as through a computer 114, a DVD player 116, a set-top box 118, and so forth. For example, the computer 114 may provide an input that causes a slide show to be displayed by the image forming device 110.

In another embodiment of the present invention, the image forming device 108 is configured to include a liquid-crystal display (LCD) 120. For example, the LCD 120 may include a stationary mirror. Light from the light source 106 is transmitted through the LCD 120 and reflected from the stationary mirror to provide an image. The LCD 120 is utilized to control the light reflected from the stationary mirror by controlling transmission of red, green and/or blue light at each pixel of the LCD 120. Like the mirrors of the digital mirror device 110, each pixel of the LCD 120 may be configured in response to input received from the interface 112. Although an image forming device 108 including a digital mirror device 110 and/or an LCD 120 is described, other components 122 may also be utilized in the image forming device 108, such as a grating light valve (GLV) or a liquid crystal on silicon (LCOS) device. Although the illustrated projector 102 shows a separate image forming device 108 and a separate light source 106, components may be added, combined and/or deleted in various embodiments.

Light that is transmitted by the image forming device 108 is output using an output device 124, such as a lens, one or more mirrors, and so on. Light 126 output by the output device 124 is then displayed on the projection screen 104 for viewing. To increase the image quality of the display on the projection screen 104, the projection screen 104 may be configured to match the output of the projector 102. For example, the projection screen 104 may employ optical filtering to reduce the amount of ambient light 128 output by an ambient light source 130 that is reflected by the projection screen 104, as will be further described in the following figure.

Figure 2:
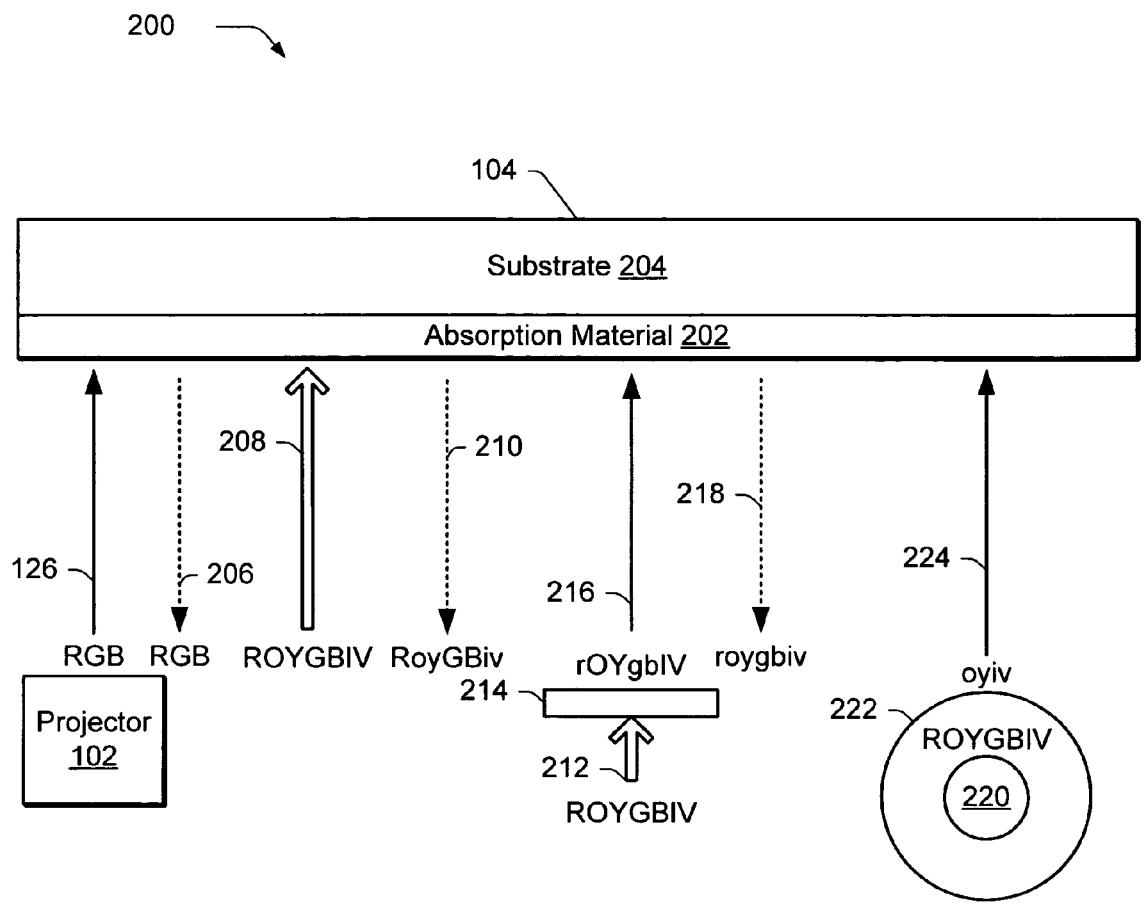
FIG. 2 is an illustration of an exemplary embodiment of the present invention showing the projection screen of FIG. 1 in greater detail.

FIG. 2 is an illustration of an exemplary embodiment 200 of the present invention showing the projection screen 104 of FIG. 1 in greater detail. As previously stated, a measure of visual quality of a projected image is contrast ratio. Contrast ratio may be affected by ambient light of the environment in which the projection screen 104 screen is included. To reduce the effect of ambient light on a display of the output from the projector 102 on the projection screen 104, the projection screen 104 utilizes optical filtering to reduce the amount of ambient light, e.g. light that is not output by the projector 102 of FIG. 1, which is reflected by the projection screen 104.

The projection screen 104, for example, may employ an absorption material 202 disposed on a substrate 204 of the projection screen 104 that reflects and/or transmits the output from the projector 104 and absorbs ambient light. Absorption is an optical property that describes a fraction of light waves that are lost through absorption of photons by atoms in a material. Absorption is a function of a path length "L" through the material and the absorption coefficient "α" of the material, and is represented by a ratio of the amount of light "I" that passes through the material to the amount of light "$I_o$–R" entering the material ($I_o$ is the amount of light incident on the material surface, R is the amount of light reflected from the surface), which is shown as follows:

$$\frac{I}{I_o - R} = e^{-\alpha L}$$

If a light wave of a given wavelength strikes a material with electrons that correspond to the wavelength, e.g. have the same frequency of vibration as the frequency of the light wave, the electrons of the material will absorb the energy of the light wave and transform it into vibrational motion. The vibration of the electrons causes an interaction with neighboring electrons such that the vibrational energy is converted into thermal energy. Thus, a light wave is absorbed which has a frequency that matches the vibrational frequency of the electrons of the material. In this way, a material with a selective absorption may be provided which absorbs particular wavelengths of light. By selecting one or more materials having selective absorption for inclusion on the projection screen 104, the projection screen 104 may be configured to reflect light that is output by the projector 102 and to absorb ambient light, i.e. light that is not output by the projector 102. The absorption materials may include a pigment, optical coating, optical dye, filter, and so on.

The projector 102 provides an output of light 126 that is composed of red, green and blue light, which is represented as "RGB" in FIG. 2. Red, green and blue light is utilized by the projector 102 through an additive color technique to provide a full color image. The additive color technique mixes various amounts of red, green and blue light, i.e. primary colors, to produce other colors. For example, by combining two primary colors, secondary colors of cyan, magenta or yellow may be produced. By combining all three primary colors, a display of white is produced. The absence of all three primary colors is utilized to produce a black display.

A variety of techniques may be employed by the projector 102 to provide a full-color image utilizing the RGB additive color technique. For example, separate red, green and blue portions of an image may be output in rapid sequence such that a full color image is perceived by the human eye. In another embodiment, red, green and blue portions of an image are output concurrently to supply a full-color image. In a further embodiment, the projector 102 includes the LCD 120 of FIG. 1. Pixels of the LCD provide red, green and blue light. A human eye views colors that are formed by the mixture of light provided by the pixels as a whole. Therefore, a full color image may be formed from light output by the pixels.

The projection screen 104 is configured to provide reflected light 206 from the light 126 that was output from the projector 102. The reflected light 206 includes the red, green and blue light that composed the light 126 that was output from the projector 102, which is illustrated in FIG. 2 by the letters "RGB". The letters "RGB" are shown as capital letters for the reflected light 206 that match the capital letters "RGB" for the light 126 to signify that a substantial portion of the light 126 was reflected by the projection screen 104 to provide reflected light 206.

The absorption material 202 of the projection screen 104 is utilized to absorb wavelengths of light that are not output by the projector 102. For instance, sunlight 208 may be provided which includes each of the wavelengths of visible light. For purposes of the present discussion, the wavelengths of visible light will be described as a range of wavelengths of red, orange, yellow, green, blue, indigo and violet visible light, which are illustrated in FIG. 2 by the letters "ROYGBIV". The absorption material 202 absorbs wavelengths of light that are not output by the projector 102, which in this embodiment are orange, yellow, indigo and violet wavelengths of light. Therefore, the amount of orange, yellow, indigo and violet wavelengths of light that is included in reflected sunlight 210 is reduced by the absorption material 202. The red, green and blue wavelengths of visible light are not absorbed by the absorption material 202, but rather are reflected by the projection screen 104 in a manner similar to the reflection provided by the projection screen 104 for the output of the projector 102. Therefore, the reflected sunlight 210 includes a substantial portion of the red, green and blue wavelengths of the sunlight 208. A substantial portion of the orange, yellow, indigo and violet wavelengths of the sunlight 208 was removed through absorption by the absorption material 202. This is illustrated in FIG. 2 by the use of corresponding capital and lower case letters to denote the intensity of light in the respective ranges, which for the reflected sunlight 210 is illustrated as "RoyGBiv".

Ambient light may be modified to take advantage of the absorption properties of the projection screen 104, thereby improving the contrast ratio of a display on the projection screen 104 over instances in which unmodified ambient light is encountered. For example, sunlight 212 includes light in each range of wavelengths of red, orange, yellow, green, blue, indigo and violet visible light. A window 214 includes a light filtering structure, such as an optical film, that absorbs and/or reflects ranges of visible light that correspond to ranges of visible light that are output by the projector 102, which in this instance are respective ranges of red, green and blue light. The window 214, however, does not filter light that is absorbed by the absorption material 202 of the projection screen 104. Therefore, light 216 that is transmitted through the window has reduced amounts of light in the red, green and blue wavelengths and higher respective amounts of orange, yellow, indigo and violet light, which is illustrated in FIG. 2 by the letters "rOYgbIV". Because of the absorptive properties of the projection screen 104, light 218 that is reflected by the projection screen 104 from the light 216 has reduced amounts of orange, yellow, indigo and violet light. The reflective properties of the projection screen 104 reflect red, green and blue wavelengths of light. Therefore, light 218 reflected from the projection screen 104 may have similar amounts of light at each respective range of wavelengths, which is illustrated in FIG. 2 with the letters "roygbiv". In this way, interference of the sunlight 212 with an output on the projection screen 104 is reduced, thereby improving the contrast ratio of the projection screen 104, yet ambient light is still provided in an environment that includes the projection screen 104 and the window 214.

A variety of ambient light sources may be provided that have tailored light output to reduce the affect of the ambient light source on the contrast ratio of an image that is projected on the projection screen 104. For instance, a light emitting device 220, such as a light bulb, may output light in each range of wavelengths of visible light, which is illustrated by the capital letters "ROYGBIV". A light filtering structure 222 is positioned to filter the light output by the light emitting device 220 that corresponds to the one or more ranges of wavelengths of light that are output by the projector 102, e.g. red, green and blue light. Light 224 that is transmitted through the light filtering structure 222 includes orange, yellow, indigo and violet light, which is illustrated by the letters "oyiv". In this embodiment, the combination of the light filtering structure 222 and the absorption material 202 remove a portion of the red, green and blue light such that any remaining red, green and blue light is not visible to the human eye. In other words, the light filtering structure 222 removes portions of the red, green and blue light that is emitted by the light emitting device 220 and the absorption material 202 absorbs the remaining portions of red, green and blue light that is transferred through the light filtering structure 222. Therefore, light 224 that is transmitted through the light filtering structure 222 does not affect the contrast ratio of an image that is displayed on the projection screen 104.

The light filtering structure 222 and the light emitting device 220 may be configured in a variety of ways. For example, the light emitting device 220 may be configured as a light bulb and the light filtering structure 222 may be configured as a globe of a light fixture that surrounds the light bulb. In another embodiment, the light filtering structure 222 is an optical coating that is applied to a light emitting device 220. In further embodiments, light emitted by a light emitting device does not include ranges of wavelengths of light that are output by the projector 102. Therefore, the light emitting device in such an embodiment does not include a light filtering structure.

Although reflection of a substantial portion of light by the projection screen 104 has been described, the substantial portion described may vary depending on the reflectivity of the projection screen 104. For example, the projection screen 104 may have an eighteen percent reflectivity of red, green and blue light and a five percent reflectivity of orange, yellow, indigo and violet light. Therefore, the projection screen 104 in this example reflects a substantial portion of red, green and blue light with respect to the amount of orange, yellow, indigo and violet light reflected by the projection screen 104.

Figure 3:
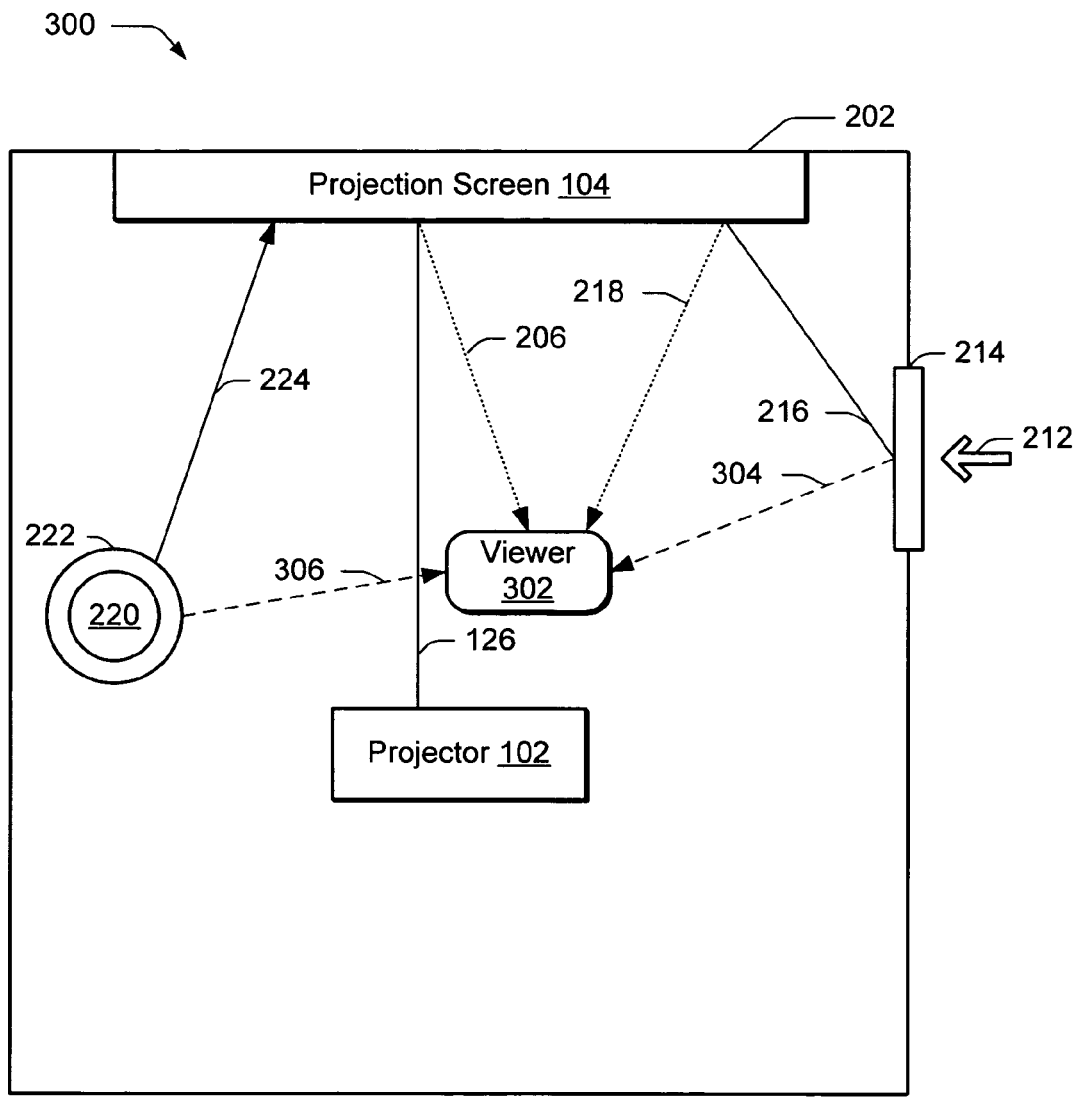
FIG. 3 is an illustration of an exemplary embodiment of the present invention showing an environment that includes the projector of FIG. 1 and the projection screen of FIG. 2.

FIG. 3 is an illustration of an exemplary embodiment of the present invention showing an environment 300 that includes the projector 102 and the projection screen 104 of FIG. 2. The projector 102 in this embodiment is illustrated as a front-projection projector that outputs light 126. The light 126 is reflected by the projection screen 104 as reflected light 206. A viewer 302 views the reflected light 206 to watch the output provided by the projector 102. For example, the light 126 that is output by the projector 102 may include a series of still images that provide a moving scene of a movie. The series of still images are reflected by the projection screen 104 such that the moving scene may be watched by the viewer 302.

Ambient light may be provided from a variety of light sources. For example, as described in FIG. 2, the window 214 transmits light 216 that is a portion of the sunlight 212 that strikes the window 214. A portion of the transmitted light 216 is reflected by the projection screen 104 such that reflected light 218 is directed at the viewer 302. Additionally, light 224 that is transmitted by the light filtering structure 222 from the light emitting device 220 is absorbed by the projection screen 104. Thus, the viewer 302 does not encounter light that is reflected by the projection screen 104 from the light emitting device 220. Even though the light 224 that is transmitted through the light filtering structure 222 and light 218 reflected by the projection screen 104 do not substantially affect an image displayed on the projection screen 104, ambient light 304, 306 is still provided to the viewer 302. Therefore, light 304 that is transmitted through the window 214, for instance, illuminates the environment 300 that includes the projector 102, the projection screen 104, and the viewer 302 without affecting a movie displayed on the projection screen 104. Likewise, light 306 that is transmitted through the light filtering structure 222 from the light source 220 may also illuminate the environment. Therefore, the viewer 302 is provided with an image from the projection device 102 that is displayed on the projection screen 104 in a well-lit environment that preserves the contrast ratio of the image.

Figure 4:
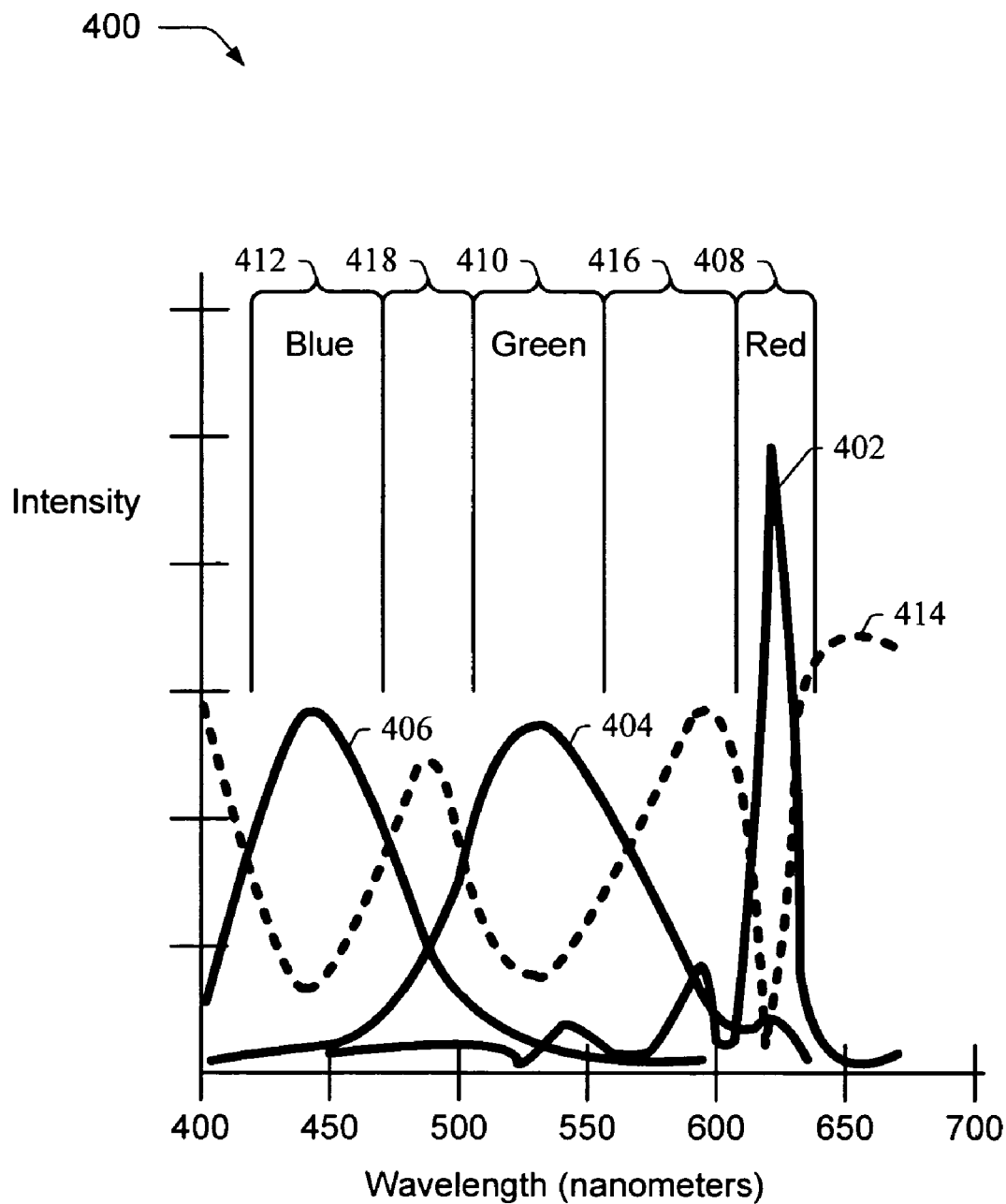
FIG. 4 is an illustration showing light that is output by the projector of FIG. 2 and light that is output by an ambient light source plotted on a graph having a first axis that describes wavelengths of visible light and a second axis that describes intensity of visible light.

FIG. 4 is an illustration of a graph 400 showing light that is output from the projection screen 104 of FIG. 2 and light that is output by an ambient light source plotted on a graph having a first axis that describes wavelengths of visible light and a second axis that describes intensity of visible light. The projection screen 104 outputs red, green and blue light 402, 404, 406 to form a full color image when viewed by the human eye as previously described. For example, the projection screen 104 of FIG. 2 may reflect light that is output from the projector 102 and/or emit light with the incidence of light that is output from the projector 102. The red light 402 is composed of a first range 408 of wavelengths of visible light in the red part of the visible spectrum. The green light 404 that is output by the projector 102 of FIG. 2 is composed of a second range 410 of wavelengths of visible light in the green part of the visible spectrum. Likewise, the blue light 406 is composed of a third range 412 of wavelengths of visible light in the blue part of the visible spectrum.

Light 414 that is output by an ambient light source, such as the window 214 and the assembly that is composed of the light emitting device 220 and light filtering structure 222, is modified to be complementary to the red, green and blue light 402, 404, 406 by the projector 102, as shown by "RGB" in the illustration of the projector 102 in FIG. 2. For example, the light 414 that is output by the ambient light source may have a greater intensity in one or more ranges of wavelengths 416, 418 of visible light than light output by the ambient light source in the first, second and third ranges 408, 410, 412. The projection screen 104 of FIG. 2 may be configured to absorb light in the one or more ranges 416, 418 of wavelengths of visible light and reflect light in the first, second and third ranges 408, 410, 412. Therefore, light 414 output by the ambient light source is modified such that light that is absorbed by the projection screen 104 has a greater intensity than that of light that is output by the ambient light source that corresponds to the light output by the projection screen 104 of FIG. 2, e.g. the first, second and third ranges 408–412.

Although light that is output by the projector 102 has been described as having ranges of red, green and blue wavelengths, a variety of ranges of wavelengths of light may be utilized. For example, in an embodiment, the projection screen 104 as shown in FIG. 2 may include a fluorescent material, such as a fluorescent dye, which emits light in response to wavelengths of light. The fluorescent material may receive ultraviolet light from the projector 102 of FIG. 2 and emit visible light in response to the ultraviolet light. In another embodiment, the projector 102 of FIG. 2 may output primary and secondary colors to provide greater color depth to a projected image. For instance, the projector 102 may output the primary colors of red, green and blue light and secondary colors such as cyan, magenta and yellow light. In a further embodiment, the projector 102 of FIG. 2 may output a single range of wavelengths of light to provide a monochromatic image when displayed on the projection screen 104.

Figure 5:
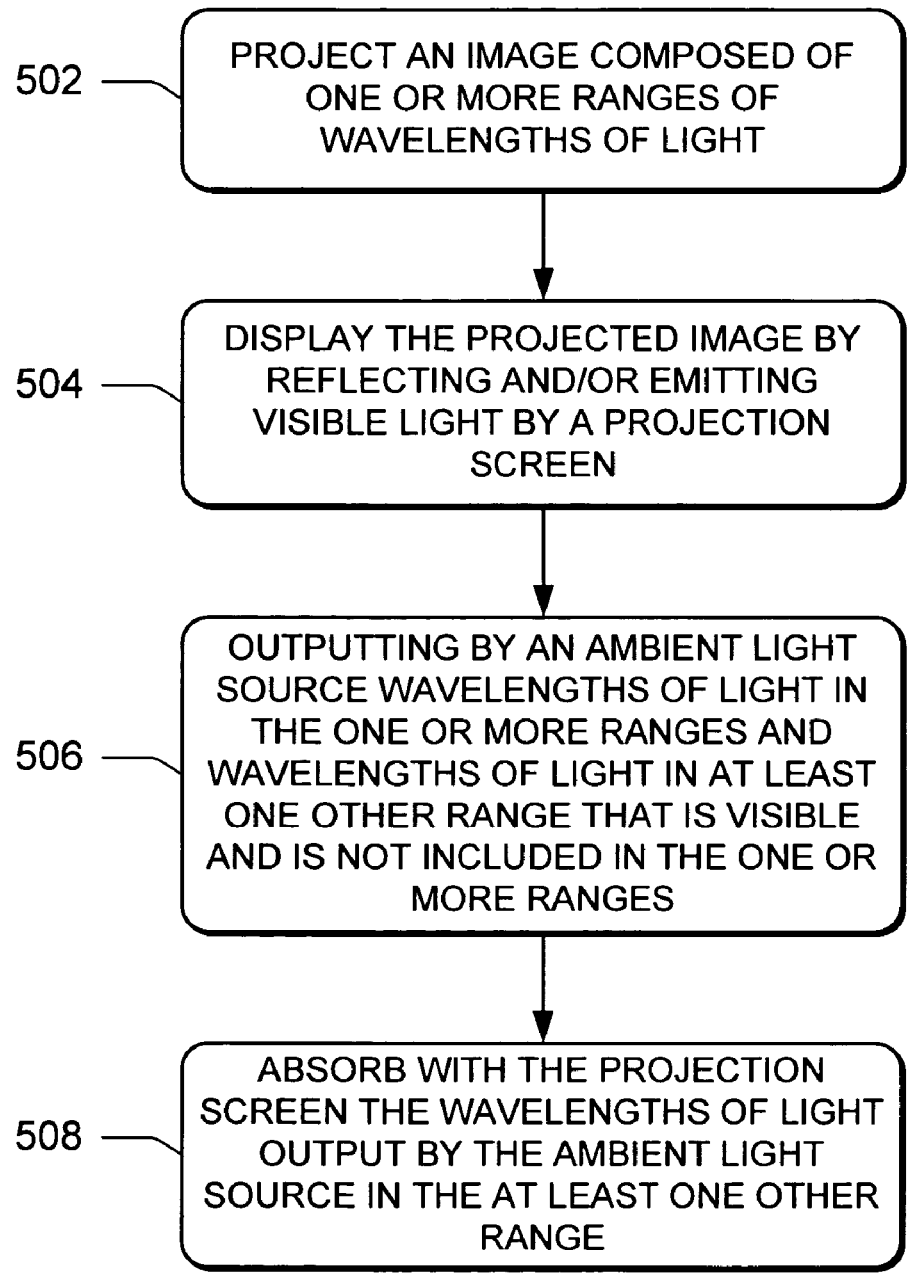
FIG. 5 is a flow chart illustrating a procedure in an exemplary embodiment of the present invention wherein ambient light is provided which preserves a contrast ratio of an image that is projected on a screen.

FIG. 5 is a flow chart illustrating a procedure 500 in an exemplary embodiment of the present invention wherein ambient light is provided which preserves a contrast ratio of an image that is projected on a projection screen. At block 502, an image is projected by a projector that is composed of one or more ranges of wavelengths of light. The image, for instance, may be a full color image when viewed by the human eye. Additionally, the image may be a still image that is included in a plurality of still images that provide a moving scene when viewed by a human eye.

At block 504, the projected image is displayed by a projection screen by reflecting and/or emitting visible light. For instance, in an embodiment, the projected image is composed of red, green and blue light that is reflected by the projection screen to display the projected image. In another embodiment, the projector outputs an image composed of ranges of wavelengths of light in the visible and ultraviolet spectrum that cause the projection screen to reflect and emit visible light so as to display the projected image.

At block 506, light is output by an ambient light source having wavelengths of light in the one or more ranges and wavelengths of light in at least one other range. The at least one other range of wavelengths includes light that is visible and that is not included in the one or more ranges. The wavelengths of light output by the ambient light source in the at least one other range have a greater intensity than that of the wavelengths of light output by the ambient light source in the one or more ranges. At block 508, the projection screen absorbs the wavelengths of light output by the ambient light source in the at least one other range.

FIG. 6 is a flow chart illustrating a procedure 600 in an exemplary embodiment of the present invention showing configuration of an ambient light source to output light that has a reduced effect on an image that is displayed on a projection screen. At block 602, an ambient light source is configured to output wavelengths of light in one or more ranges that cause a projection screen to reflect and/or emit visible light and wavelengths of light in at least one other range that is visible and that is not included in the one or more ranges. The one or more ranges are suitable to provide a full-color image when output by a projector and displayed on the projection screen. Additionally, wavelengths of light in the at least one other range are absorbed when received by the projection screen.

The ambient light source may be configured in a variety of ways. For example, at block 604, a light emitting device is received that is configured to emit wavelengths of light that include the one or more ranges and the at least one other range. At block 606, a light filtering structure is positioned that is configured to reflect and/or absorb the one or more ranges of wavelengths of light. For instance, the light emitting device may be configured to emit red, orange and yellow wavelengths of visible light. The light filtering structure is configured to filter the red wavelengths of visible light from light that is output by the light emitting device. Therefore, light that is transmitted through the light filtering structure is composed of orange and yellow wavelengths of visible light.

In another example, at block 608, a light emitting device is formed to emit light in the at least one other range that has a greater intensity than that of the light that is emitted by the light emitting device in the one or more ranges ranges. For example, the light emitting device may be formed from a collection of light emitting diodes that emit light in the orange, yellow, indigo and violet ranges but not in the red, green and blue ranges of visible light.

Although the invention has been described in language specific to structural features and methodological steps, it is to be understood that the invention defined in the appended claims is not necessarily limited to the specific features or steps described. Rather, the specific features and steps are disclosed as preferred forms of implementing the claimed invention.

What is claimed is:

1. A projection system comprising:
    a projection screen to:
    reflect one or more ranges of wavelengths of visible light in a first group and emit visible light responsive to ultraviolet light;
    absorb visible wavelengths of light in a second group not included in the first group; and
    an ambient light source that is configured to output visible wavelengths of light in the second group that has a greater intensity than that of wavelengths of light output by the ambient light source In the first group.

2. A projection system as described in claim 1, further comprising a projector to project an image composed of the one or more ranges of wavelengths of light in the first group.

3. A projection system as described in claim 1, wherein the one or more ranges in the first group include:
    a range of red wavelengths of visible light;
    a range of green wavelengths of visible light; and
    a range of blue wavelengths of visible light.

4. A projection system as described in claim 1, wherein the ultraviolet light includes a range of ultraviolet wavelengths that cause the projection screen to emit the visible light.

5. A projection system as described in claim 1, wherein the one or more ranges in the first group include a range of ultraviolet wavelengths and a range of visible wavelengths.

6. A projection system as described in claim 1, further comprising a projector to project an image composed of the one or more ranges of wavelengths of light Included in the first group, wherein the projector includes a component selected from the group consisting of:
    a digital micromirror device (DMD);
    a liquid crystal display (LCD);
    a grating light valve (GLV); and
    a liquid crystal on silicon (LCOS) device.

7. A projection system as described in claim 1, wherein the projection screen is configured to absorb the visible wavelengths of light in the second group by utilizing a component selected from the group consisting of:
    a filter;
    a pigment;
    an optical coating;
    an optical dye; and
    any combination thereof.

8. A projection system as described in claim 1, wherein the ambient light source further comprises:
    a light emitting device that emits wavelengths of light that include:
        the one or more ranges of the first group; and
        the one or more ranges of the second group; and
    a light filtering structure that:
    reflects and absorbs wavelengths of light emitted by the light emitting device in the first group; and
    transmits wavelengths of light in the second group.

9. A projection system as described in claim 1, wherein the ambient light source does not output an image.

10. A projection system comprising:
    a projection screen to:
    reflect one or more ranges of wavelengths of visible light in a first group and emit visible light responsive ultraviolet light; and
    absorb visible wavelengths of light in a second group not Included in the first group wherein wavelengths in the second group have a greater intensity than wavelengths in the first group; and
    a light filtering structure that:
    reflects and absorbs wavelengths of light emitted by an ambient light emitting device in the first group; and
    transmits wavelengths of light emitted by the ambient light emitting device in the second group.

11. A projection system as described in claim 10, further comprising a projector to project an image composed of the one or more ranges of wavelengths of light in the first group.

12. A projection system as described in claim 10, wherein the one or more ranges in the first group include:
    a range of red wavelengths of visible light;
    a range of green wavelengths of visible light; and
    a range of blue wavelengths of visible light.

13. A projection system as described in claim 10, wherein the ultraviolet light includes a range of ultraviolet wavelengths that cause the projection screen to emit the visible light.

14. A projection system as described in claim 10, wherein the one or more ranges in the first group include a range of ultraviolet wavelengths and a range of visible wavelengths.

15. A projection system as described in claim 10, wherein the projection screen is configured to absorb the visible wavelengths of light in the second group by utilizing a component selected from the group consisting of:

a filter;
a pigment;
an optical coating;
an optical dye; and
any combination thereof.

16. An apparatus comprising:
a light filtering structure that:
reflects and absorbs wavelengths of light encountered by the light filtering structure in one or more ranges in a first group; and
transmits wavelengths of visible light encountered by the light filtering structure in a second group not included in the first group, wherein:
the wavelengths of light transmitted by the light filtering structure in the second group have a greater intensity than that of the wavelengths of light transmitted by an ambient light source in the first group;
the wavelengths of light in the first group provide a white light when displayed by a projection screen;
the wavelengths of light in the second group are absorbed when received by the projection screen; and
a window, with the light filtering structure disposed on the window.

17. An apparatus as described in claim 16, further comprising a light emitting device that emits wavelengths of light that include:
the one or more ranges in the first group; and
the second group.

18. An apparatus as described in claim 16, wherein the window includes a configuration to transmit wavelengths of light in the first group and the second group.

19. An apparatus as described in claim 16, wherein the first group includes:
a range of red wavelengths of visible light;
a range of green wavelengths of visible light; and
a range of blue wavelengths of visible light.

20. An apparatus as described in claim 16, wherein the first group includes a range of ultraviolet wavelengths that cause the projection screen to emit visible light.

21. An apparatus as described in claim 16, wherein the first group includes a range of ultraviolet wavelengths and a range of visible wavelengths.

22. A method comprising:
projecting, by a projector, an image composed of one or more ranges of wavelengths of light in a first group;
displaying the projected image by reflecting visible light by a projection screen and emitting visible light responsive ultraviolet light; and
outputting by an ambient light source:
wavelengths of light in the first group; and
wavelengths of light in a second group not included in the first group, wherein the wavelengths of light output by the ambient light source in the second group have a greater intensity than that of the wavelengths of light output by the ambient light source in the first group.

23. A method as described in claim 22, further comprising absorbing by the projection screen wavelengths of light of the second group output by the ambient light source.

24. A method as described in claim 22, wherein the first group includes:
a range of red wavelengths of visible light;
a range of green wavelengths of visible light; and
a range of blue wavelengths of visible light.

25. A method as described in claim 22, wherein the displayed image is a full-color image when viewed by a human eye.

26. A method as described in claim 22, wherein the first group includes a range of ultraviolet wavelengths of the ultraviolet light that cause the projection screen to emit the visible light.

27. A method as described in claim 22, wherein the first group includes a range of ultraviolet wavelengths and a range of visible wavelengths.

28. A method comprising:
configuring an ambient light source to output:
wavelengths of light in one or more ranges in a first group that cause a projection screen to reflect visible light and ultraviolet light to cause the projection screen to emit visible light; and
wavelengths of light in a second group not included in the first group, wherein: the wavelengths of light in the first group provide a full-color image when displayed on the projection screen;
wavelengths of light in the second group are absorbed when received by the projection screen; and
wavelengths of light output in the second group have a greater intensity than wavelengths of light output in the first group.

29. A method as described in claim 28, wherein the configuring further comprises positioning a light filtering structure that is configured to reflect and absorb one or more ranges of visible light from the first group emitted by a light emitting device that is configured to emit light having wavelengths in the second group and the first group.

30. A method as described in claim 28, wherein the first group includes:
a range of red wavelengths of visible light;
a range of green wavelengths of visible light; and
a range of blue wavelengths of visible light.

31. A method as described in claim 28, wherein the first group includes a range of ultraviolet wavelengths of the ultraviolet light that cause the projection screen to emit the visible light.

32. A method as described in claim 28, wherein the first group includes a range of ultraviolet wavelengths and a range of visible wavelengths.

33. A system comprising:
means for projecting an image composed of one or more ranges of wavelengths of light in a first group;
means for displaying the projected image that:
reflects visible light in response to the wavelengths of light in the first group and emits visible light in response to impinging ultraviolet light; and
absorbs visible wavelengths of light in a second group not included in the first group; and
means for providing ambient light that outputs visible wavelengths of light in the second group that has a greater intensity than that of wavelengths of light output by the providing means in the first group.

* * * * *

UNITED STATES PATENT AND TRADEMARK OFFICE
CERTIFICATE OF CORRECTION

PATENT NO. : 7,040,764 B2  Page 1 of 1
APPLICATION NO. : 10/691835
DATED : May 9, 2006
INVENTOR(S) : Przybyla et al.

It is certified that error appears in the above-identified patent and that said Letters Patent is hereby corrected as shown below:

In the Claims

Col. 9 (line 55), delete "In" and insert therefor --in--.

Col. 10 (line 6), delete "Included" and insert therefor --included--.

Col. 10 (line 41), delete "Included" and insert therefor --included--.

Signed and Sealed this

Twenty-third Day of January, 2007

JON W. DUDAS
*Director of the United States Patent and Trademark Office*